(12) United States Patent
Obeid et al.

(10) Patent No.: US 11,821,464 B1
(45) Date of Patent: Nov. 21, 2023

(54) BEARING SYSTEM WITH CANTILEVER SUPPORTS AND RUN-IN METHOD

(71) Applicant: RBTS Inc., Phoenixville, PA (US)

(72) Inventors: Victor K. Obeid, Collegeville, PA (US); Michael D. Neary, Bryn Mawr, PA (US); Edward J. Marlinski, Lansdale, PA (US)

(73) Assignee: RBTS Inc., Phoenixville, PA (US)

( * ) Notice: Subject to any disclaimer, the term of this patent is extended or adjusted under 35 U.S.C. 154(b) by 49 days.

(21) Appl. No.: 17/541,308

(22) Filed: Dec. 3, 2021

Related U.S. Application Data (60) Provisional application No. 63/120,782, filed on Dec. 3, 2020.

(51) Int. Cl.
*F16C 27/02* (2006.01)
*F16C 17/03* (2006.01)

(52) U.S. Cl.
CPC ............ *F16C 27/02* (2013.01); *F16C 17/035* (2013.01); *F16C 2316/18* (2013.01)

(58) Field of Classification Search
CPC .... F16C 17/035; F16C 27/02; F16C 2316/18; F16C 2231/00; A61M 60/818; A61M 60/824; A61M 60/825
See application file for complete search history.

(56) References Cited

U.S. PATENT DOCUMENTS

| | | | | |
|---|---|---|---|---|
| 5,102,237 | A * | 4/1992 | Ide .......................... | F16C 17/035 384/224 |
| 5,503,479 | A * | 4/1996 | Ide .......................... | F01D 25/166 384/124 |
| 10,722,627 | B1 * | 7/2020 | Obeid ..................... | F16C 17/10 |
| 11,441,601 | B1 * | 9/2022 | Obeid ................... | F16C 33/043 |
| 2017/0175808 | A1 * | 6/2017 | Pruitt .................... | F04D 29/284 |

OTHER PUBLICATIONS

Noria Corporation, Lubrication Regimes Explained, Sep. 22, 21.*

* cited by examiner

*Primary Examiner* — James Pilkington
(74) *Attorney, Agent, or Firm* — Joseph E. Maenner; Maenner & Associates, LLC (57) ABSTRACT

A rotor bearing system includes a mandrel and a plurality of canted cantilever bearing pads supporting the mandrel, such that, when the bearing pads are run-in against the mandrel, the bearing pads generate uniform bearing gaps and alignment. The mandrel and the bearing pads are sized to form a running proximity to exclude the entry of red blood cells or flow entrained contaminant inclusions therebetween during operation, thereby causing the bearing system to operate in an elasto-hydrodynamic regime of mixed- or boundary-lubrication.

20 Claims, 12 Drawing Sheets

BEARING SYSTEM WITH CANTILEVER SUPPORTS AND RUN-IN METHOD

FIELD OF THE INVENTION

This invention relates to the field of pumps. In particular, this invention is drawn to bearings for various blood pump rotor and stator configurations.

BACKGROUND OF THE INVENTION

Mechanical circulatory support systems (MCSS) from a variety of manufacturers have been used to treat many types of heart function degradation over the past several decades. This includes, but is not limited to, the class of devices known as ventricle assist devices or VADs. Such devices can be axial, radial, or mixed flow pumps designed either for intrathoracic, intracardiac, pericardiac, intra-aortic, or intra-arterial implantation. Such devices can be characterized by rotary, reciprocating, oscillatory or linear motion and can be steady state or pulsatile or phasic in function. One recurring problem in VADs is blood hemolysis due to excessive shear stress being applied to the red blood cells as they pass through the rotor bearing system which may have poorly fitted bearings with gaps between stationary and moving components large enough to permit ingress of blood plasma and erythrocytes (red blood cells—RBC). Passage of RBC through such bearing gaps at operating speeds perhaps in thousands of revolutions per minute for a rotary system or in meters per second in a linear or oscillatory system, can lead to damaging levels of stress to act upon the RBC, thereby leading to cell rupture and hemolysis.

Many current VAD designs contain bearing geometry that develops and supports an elasto-hydrodynamic lubrication layer that prevents red blood cells from entering the fluid running gap between bearing and journal, thereby eliminating hemolysis within the bearing system. The use of select pairs of advanced engineering materials and tribological pressure-velocity (PV) analysis for such materials pairs provides a zero-wear to very-low wear bearing system. One of the challenges faced with this close running bearing design is to achieve the proper clearance between final manufactured components and obtain proper matching of curvature of the mating bearing surfaces.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This invention pertains to pumps, heart assist pumps, in particular the bearings systems required to successfully support, locate and guide a pump's moving components with respect to a pump's stationary components. This invention pertains to bearing systems with tight geometric tolerances designed to exclude flow entrained particles, such as red blood cells or contaminant inclusions, from entering the bearing running gap. This invention provides particular design techniques and run-in methods to achieve the proper clearance between components and obtain proper matching of curvature of the mating bearing surfaces.

In pump designs a multiplicity of bearing surfaces are positioned both circumferentially to counteract radial pull forces and pads are positioned axially to counteract axial loads and overturning moments. These active bearing surfaces with favorable geometry beneficial to sliding-surface bearing operation may be fabricated on bearing pads to create a space designed for through-flushing between the moving and non-moving pump components, to prevent thrombus formation. Such bearings and blood wetted components are designed and fabricated from certain engineering materials preferred for bearings such as hard ceramics or engineered plastics.

Bearings, fabricated from metals, ceramics, or engineered plastics, must be ground, honed and lapped to final size and shape. Moreover, it can be difficult to machine features with tight tolerances in engineered plastics due to material deformation and heat generation while under tool cutting loads. Both mating parts of the bearing must be fabricated to precision tolerances with fine mirrorlike surface finish. The invention described below in detail provides a spring-loaded bearing support design followed by run-in techniques to achieve the required final geometric dimensions and form tolerances.

BRIEF DESCRIPTION OF THE DRAWINGS

The present invention is illustrated by way of example and not limitation in the figures of the accompanying drawings. In these figures the bearings and mandrels or bearings and journals are illustrated as standalone components without the illustration of non-bearing pump components such as the pump housing, rotor body, pump impeller, motor magnetic components etc. Furthermore, like references indicate similar elements across multiple illustrations.

DETAILED DESCRIPTION

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Bearings as described in this invention can be deployed in traditional rotary pump configurations with rotor located on the device central-axis with a surrounding non-rotating stator. Alternatively, the bearings can be used in out-runner style pumps where the centrally located stator is stationary and the radially outward rotor rotates relatively to the fixed stator. Moreover, these bearings could be used in eccentrically notating, oscillating, or linear motion devices.

Figure 1:
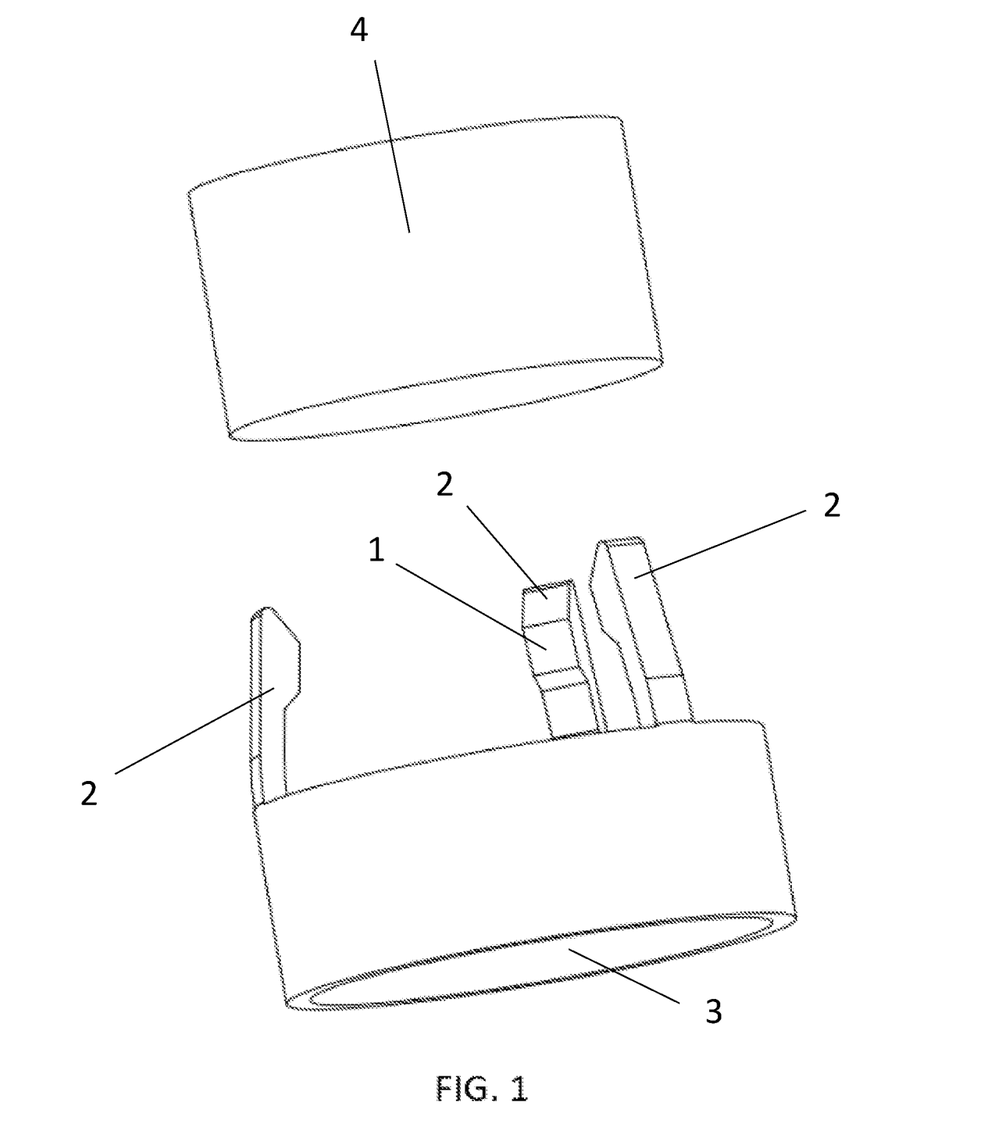
FIG. 1 is a perspective view of an exemplary embodiment of a single-row canted-inward cantilever-support style bearing before placement onto a straight mandrel or shaft.
Figure 1A:
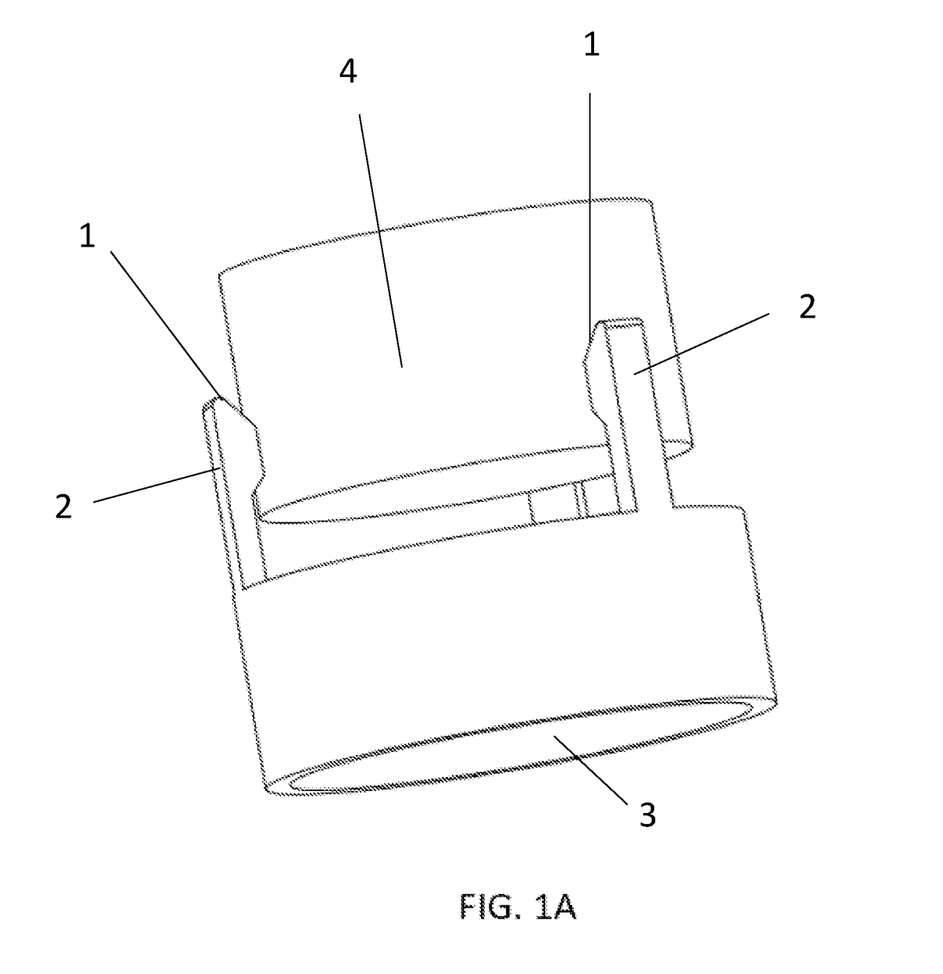
FIG. 1A is a perspective view of the bearing of FIG. 1 after placement on the straight mandrel or shaft.
Figure 2:
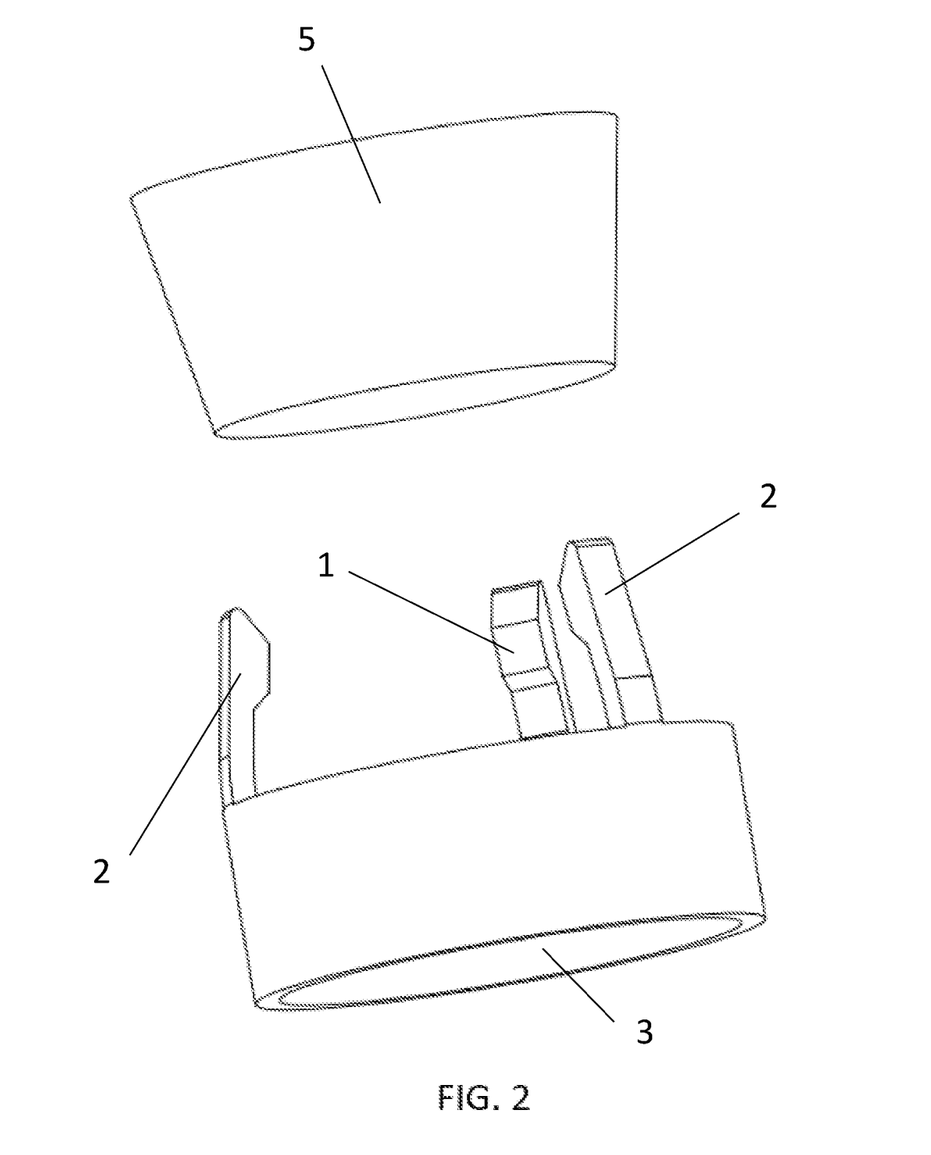
FIG. 2 is a perspective view of an alternative exemplary embodiment of a single-row canted-inward cantilever-support style bearing before placement onto a conical mandrel or shaft which is used to shape and hone bearing tapers.
Figure 2A:
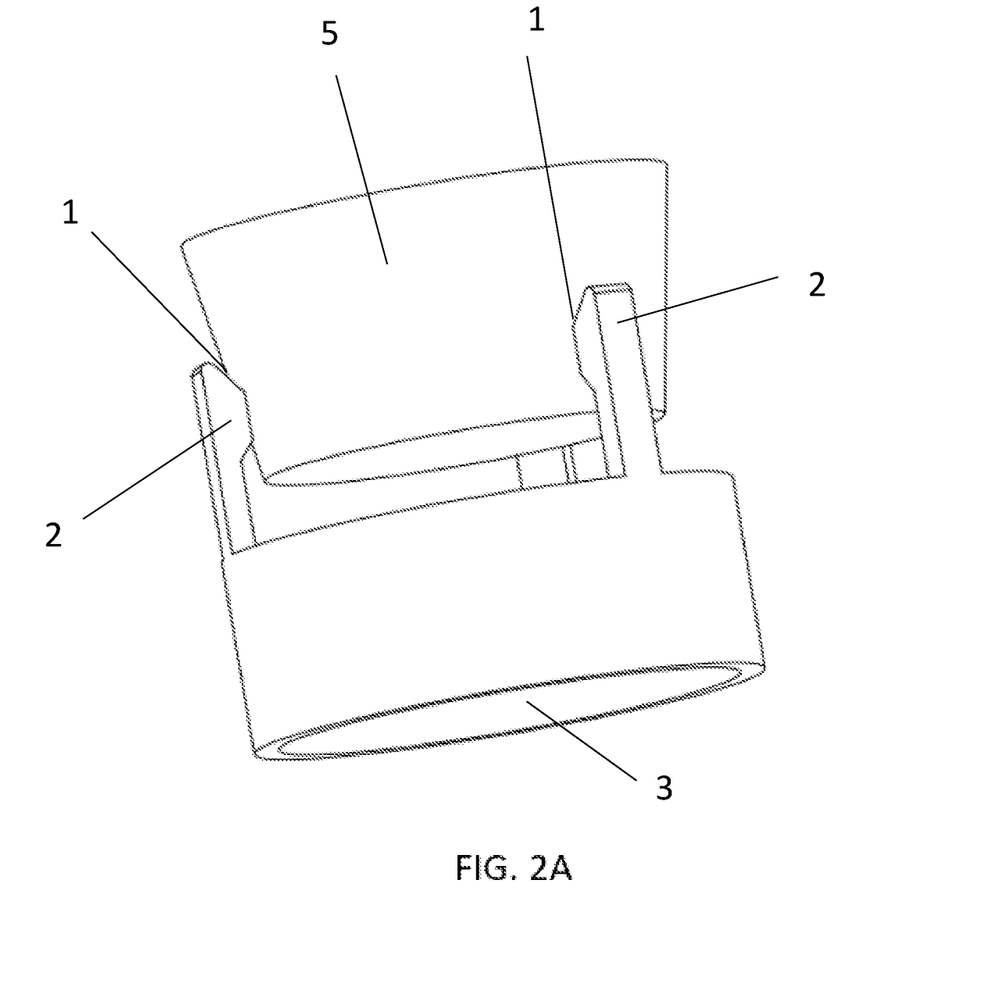
FIG. 2A is a perspective view of the bearing of FIG. 2 after placement on the conical mandrel or shaft.

In designing a heart pump bearing, a load carrying surface area, or contact area 1, between a bearing 3 and a journal or mandrel 4 is sized to generate an acceptable level of bearing stability, damping, and a favorable pressure-velocity (PV) value between the two mating bearing components. As shown in FIGS. 1 and 1A, mandrel 4 has a generally cylindrical shape, while, as shown in FIGS. 2 and 2A, a mandrel 5 has a generally conical shape.

The calculation of a pressure-velocity value for combinations of typical bearing materials is a technique common to the study of tribology in order to predict the success of a bearing system versus its expected loading and rotational speed operating envelope. Low PV values, for known combinations of preferred bearing materials, can result in zero-wear to extremely low-wear rates of the fixed and moving bearing system components.

Figure 3:
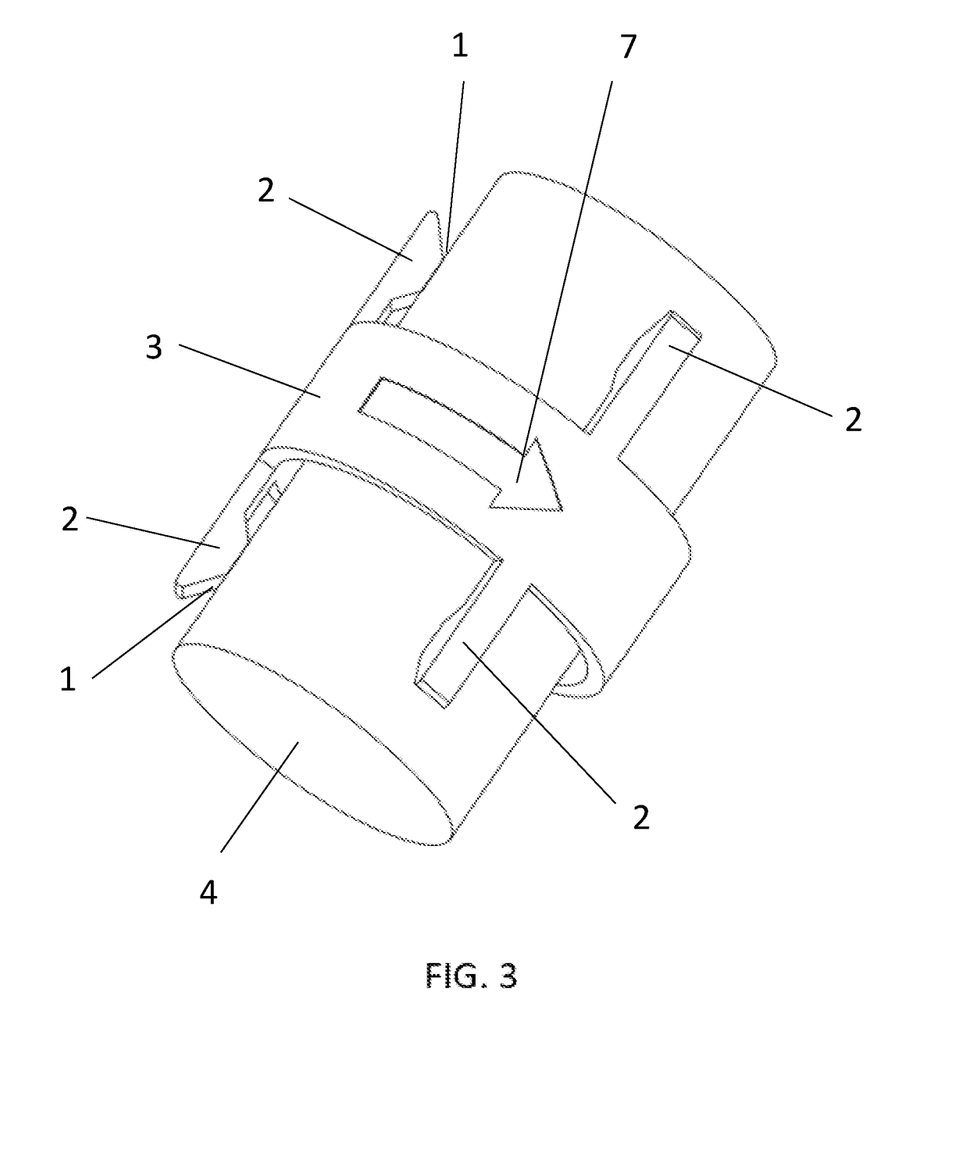
FIG. 3 is a perspective view of a double-row canted-inward cantilever-support style bearing installed on a straight mandrel. The axial separation of bearing pads located on cantilever pads or cantilever support fingers placed in opposite axial directions provides for overturning moment resistance, in additional to the radial locating bearing function. The directional arrows show run-in motion applied in a rotational direction.
Figure 3A:
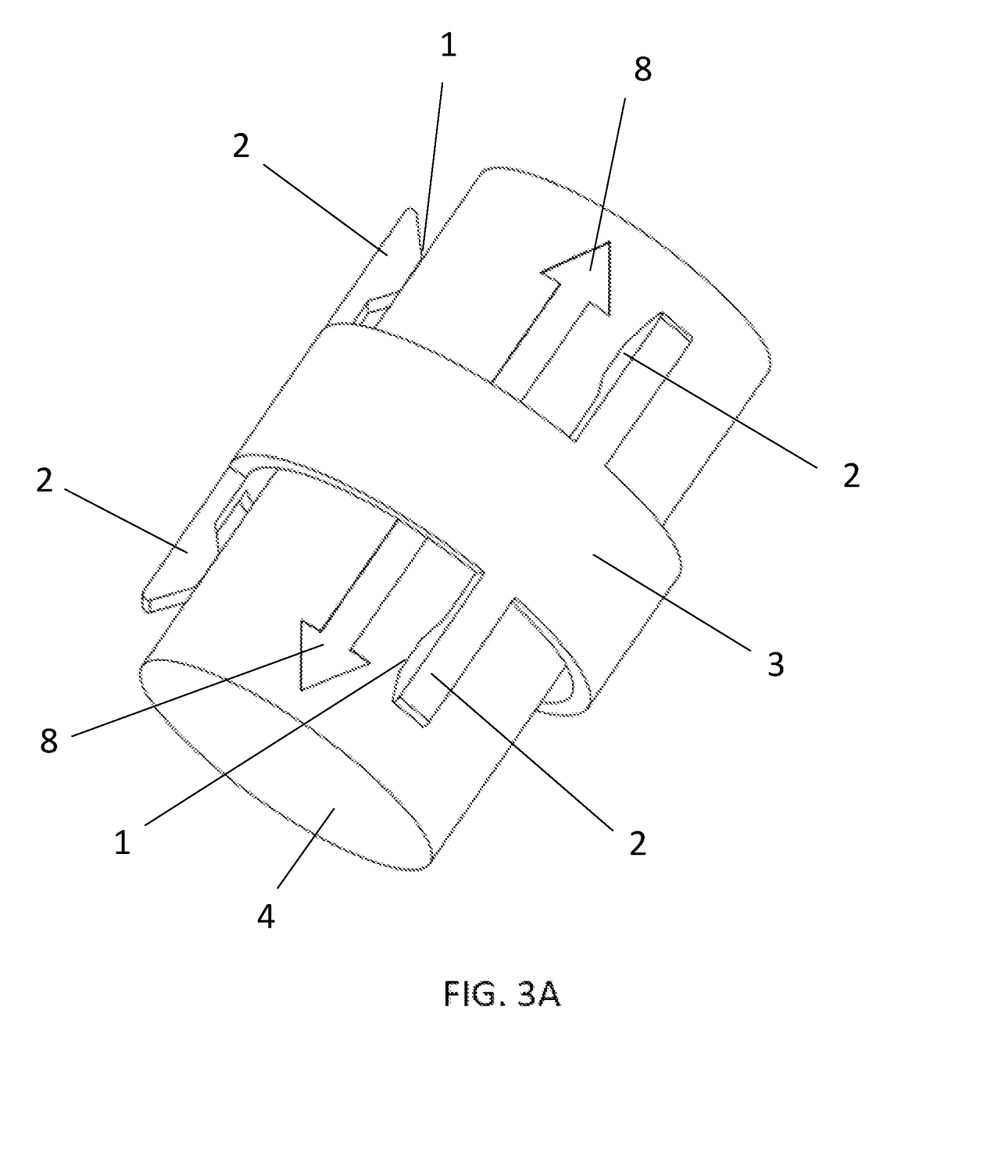
FIG. 3A is a perspective view of the bearing of FIG. 3, with directional arrows showing an axial oscillatory motion.
Figure 3B:
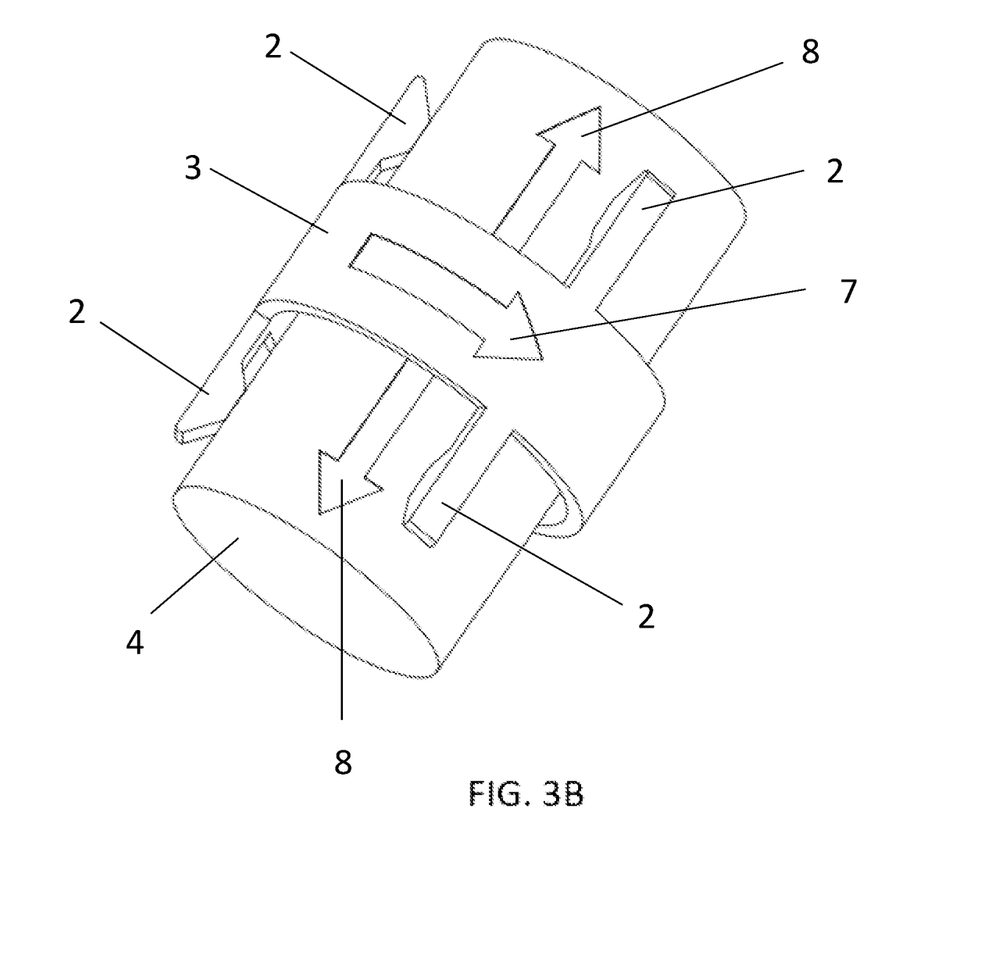
FIG. 3B is a perspective view of the bearing of FIG. 3, with directional arrows showing a combined axial and rotational run-in motion.

Hydrodynamic bearing design requires a converging fluid wedge in order for successful hydrodynamic film establishment and hydrodynamic bearing operation. This fluid wedge is achieved by placing a contacting land adjacent to the bearing land which faces the direction of movement. Rotors or sliders that reverse direction will have dual or multiple tapers, with a taper facing each direction of rotor or slider motion. In an exemplary embodiment, as shown in FIG. 1, the tapers can be rectangular in shape. This taper design may be 0.002 inches (0.0508 mm) in overall height with respect to the datum reference to the bearing land, or preferably may be 0.000200 inches (0.00508 mm) tall. This taper height within the preferred tolerance range can be achieved using the bearing run in process on a conically shaped mandrel 5, shown in FIG. 2, wherein the canted inward finger-like cantilever pads 2 force the bearing material against the conical mandrel 5 in the presence of rotational motion (shown by arrow 7), an axial oscillatory motion (shown by arrow 8), or a combined rotational motion and axial oscillatory motion, as shown in FIGS. 3-3B. The rotational motion and/or the axial oscillatory motion can be generated by either moving bearing pads 2 relative to a fixed mandrel 4, 5 or mandrel 4, 5 can be moved relative to a fixed set of bearing pads 2. The movement of bearing pads 2 relative to mandrels 4, 5 is performed for the purpose of running-in, or wearing-in and honing the bearing system.

The various implementations presented below are purposefully designed to achieve tight sliding-fit clearance operation between the journal or slider and raised bearing pads on the mating, moving bearing component, thereby causing the bearing system to operate in an elasto-hydrodynamic regime of mixed-film or boundary-lubrication. Such tight clearance operation excludes the entry of red blood cells or flow entrained contaminant inclusions between the bearing running surfaces. Such clearances for hydrodynamic bearings or elasto-hydrodynamic bearings could be in the range up to 0.025 0.051 mm (0.001 or 0.002 inches), or more preferably down to 0.013 mm (0.0005 inch) clearance, or most preferably 0.0005 to 0.0023 mm (0.000020 to 0.000090 inches) clearance.

The present invention provides a method to form the final properly sized and uniform gap and create appropriately fine surface finishes. The first method is to purposely machine canted cantilever-support bearing pads 2 as shown at an exaggerated cant angle. Once the rotor is installed on the mandrel and rotational, axial, or combined motion is applied, the cantilever-support forces the bearing in the abrasive mandrel, thereby removing bearing pad material. Once enough material is removed, the spring force lessens and becomes negligible as the bearing is worn-in to a proper and uniform gap size. This process results in a conformal, tight sliding-fit clearance between the parts. The journal, or abrasive mandrel, or abrasive media should be harder than the bearing pad material, to ensure the bearing pad is the component being reduced in size. The contacting lands on bearing pads 1 are formed by running-in in with the presence of an abrasive slurry, paste or media comprising at least one of aluminum oxide, silicon carbide, diamond paste, and diamond, on the mandrel 4, 5 for the purpose of completing the bearing system to final size and finish a taper on either side of contacting land 1 adjacent to the mandrel 4, 5.

In an exemplary embodiment, pads 2 can be fabricated from a material including one of ceramic, aluminum-oxide, sapphire, silicon carbide, and yttria-stabilized zirconia. Alternatively, the pads 2 can be constructed from an engineered plastic, including one of poly ether-ether ketone (PEEK), ultra-high molecular weight polyethylene (UHMWPE), polyetherimide, and polytetrafluoroethylene (PTFE).

Figure 4:
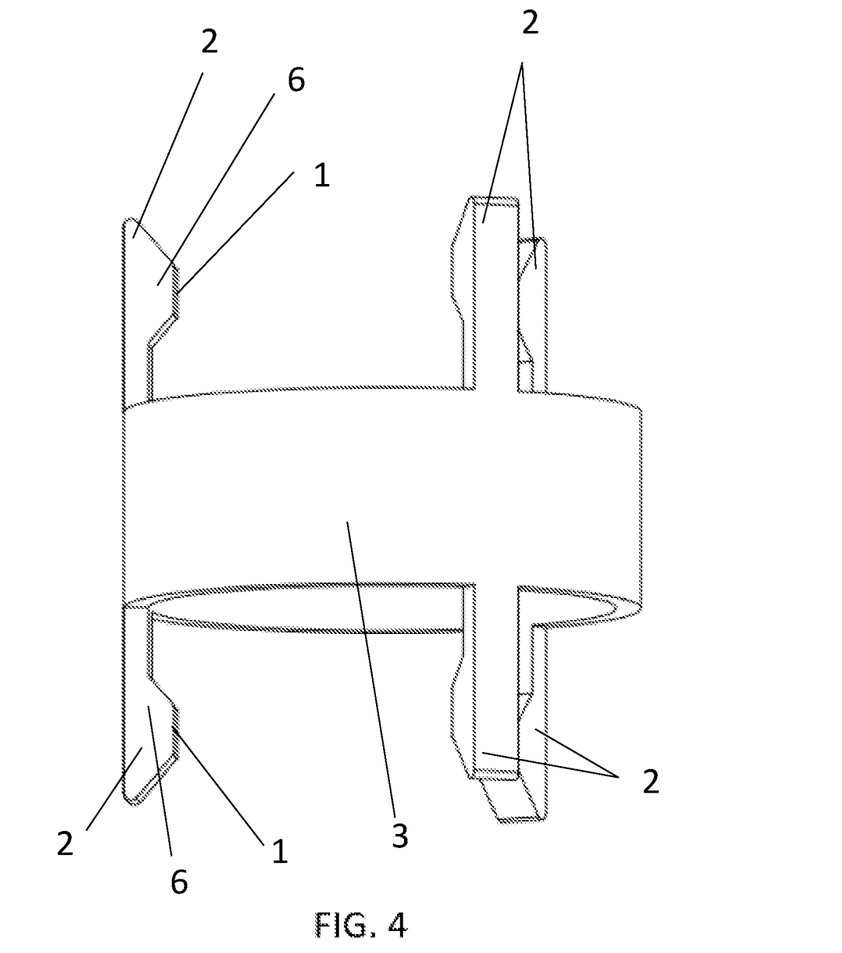
FIG. 4 is a perspective view of a double-row cantilever-support with over-height bearing pads for a bearing according to another exemplary embodiment of the preset invention.
Figure 4A:
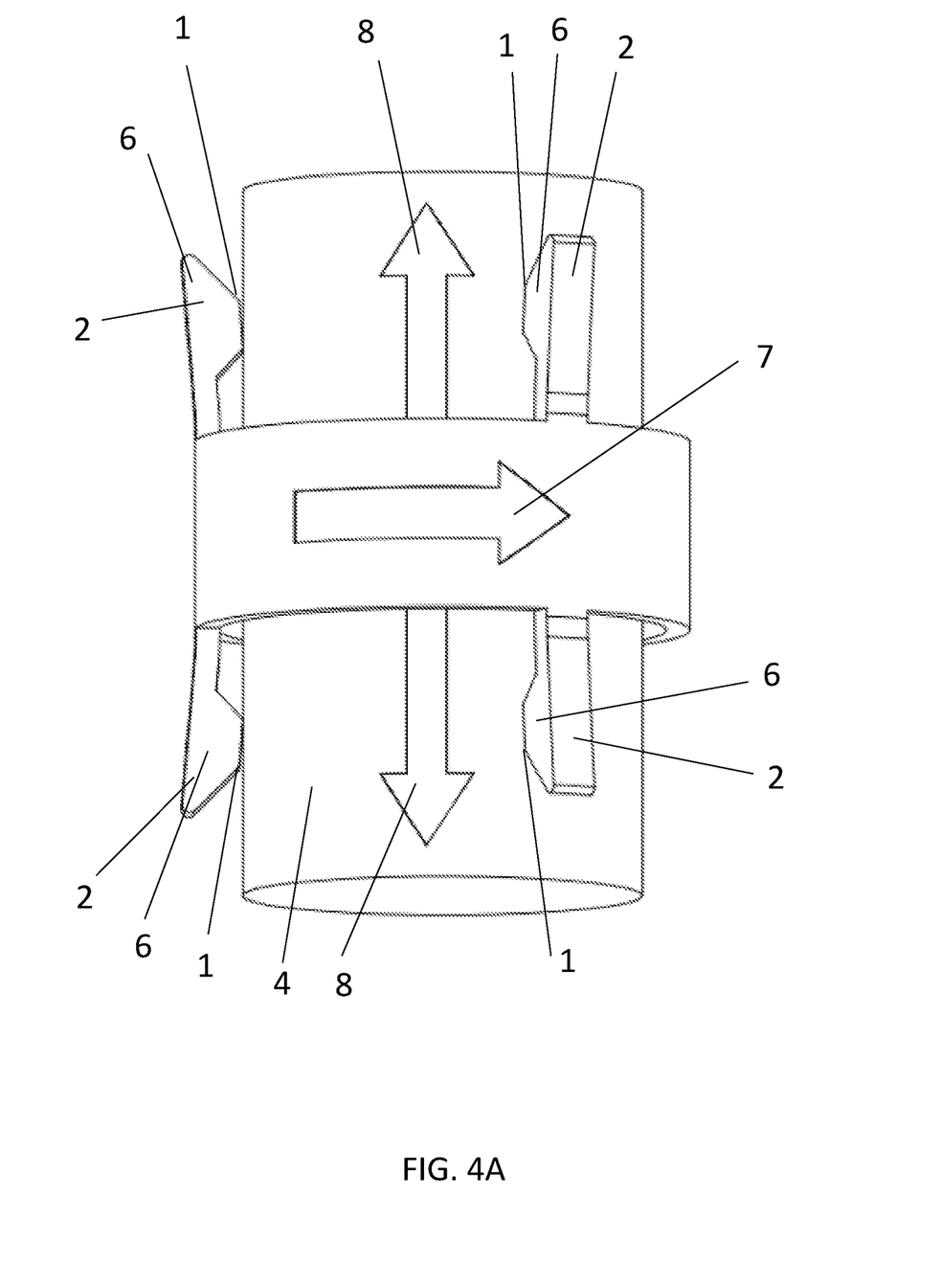
FIG. 4A is a perspective view of a bearing using the support shown in FIG. 4 such that when installed on a straight mandrel or shaft the cantilever support bearing pads bend outwards a predetermined amount, with directional arrows showing run-in motion applied in combined axial and rotational directions.
Figure 5:
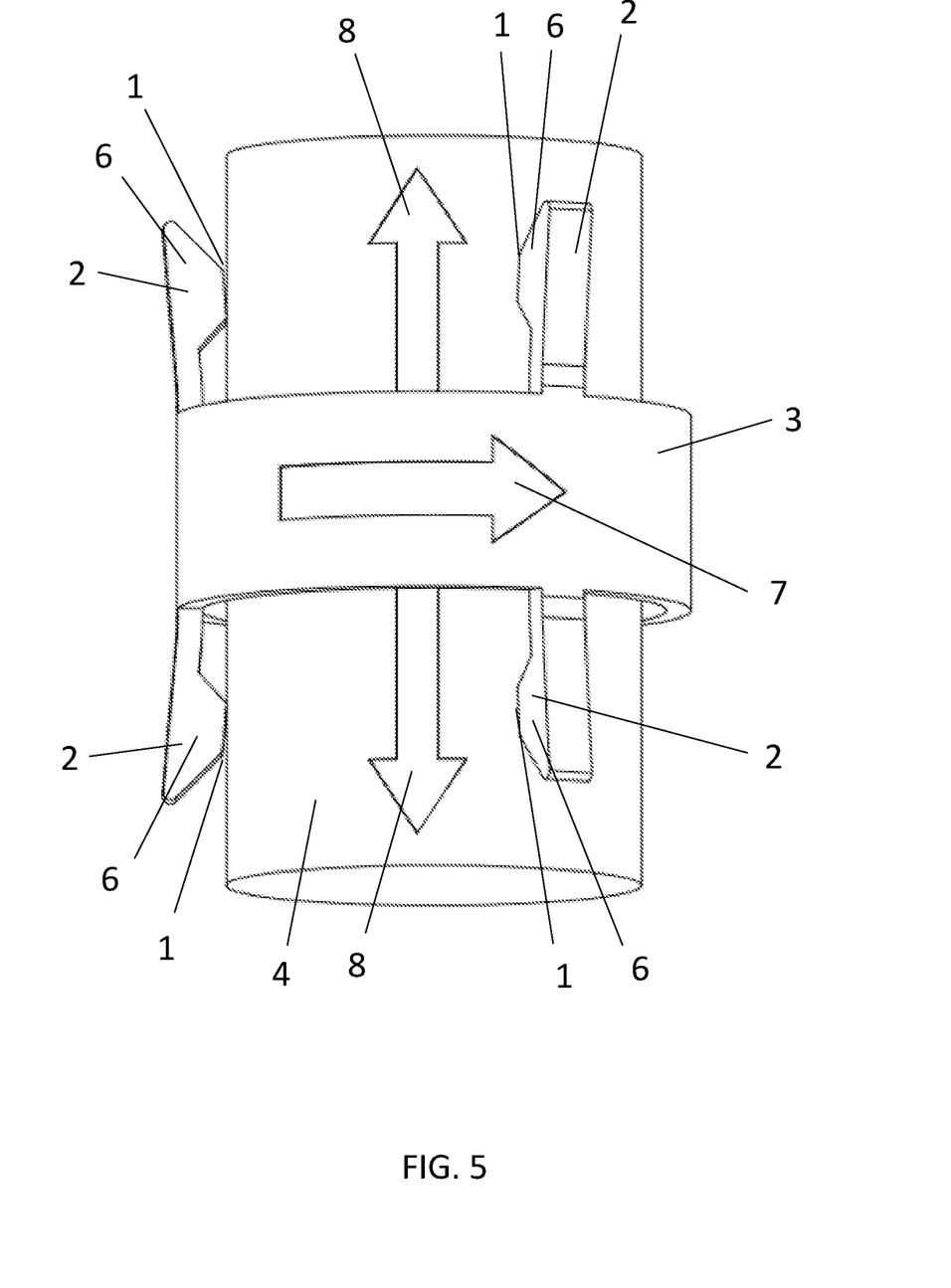
FIG. 5 is a perspective view of a double-row cantilever-support style bearing with over-height bearing pads, such that when installed on a straight mandrel or shaft the cantilever bearing pads bend outwards a predetermined amount, with directional arrows showing run-in motion applied in combined axial and rotational directions.
Figure 5A:
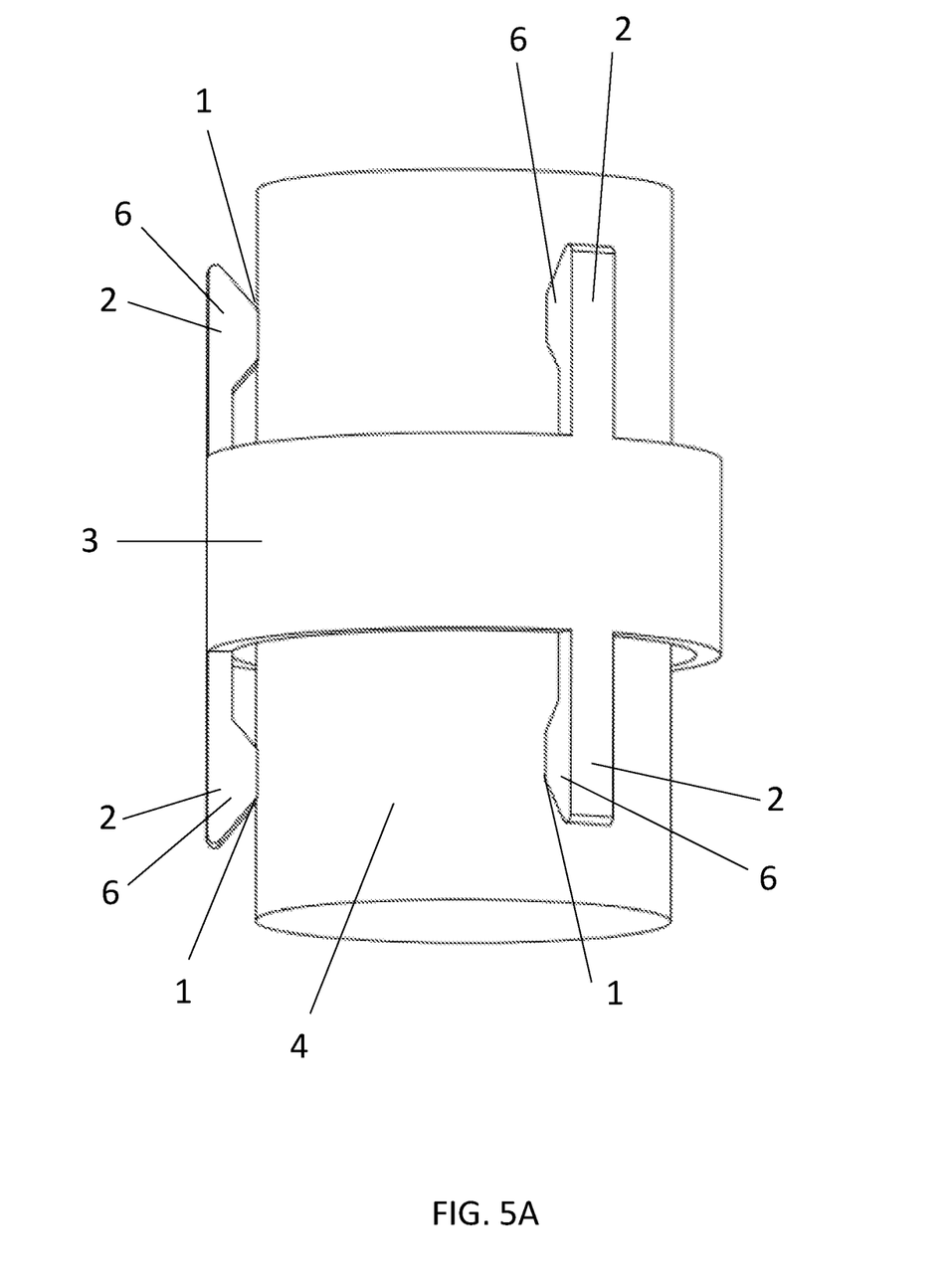
FIG. 5A is a perspective view of the bearing of FIG. 5 after run-in, with a desired bearing height being achieved.

An alternative embodiment of the invention is illustrated in FIGS. 4-5A in which the bearing pads are machined straight with respect to the part central axis; however, an over-height bearing pad 6 is utilized. When installed on the journal or abrasive mandrel the as shown exaggerated in FIG. 4, the cantilever pads 2 are biased or canted outwards. Once the rotational, axial, or combined rotational and axial motion is applied as in FIG. 5 and enough material is removed, as shown in FIG. 5A, the spring force will lessen and become negligible as the bearing is worn-in to the proper and uniform gap size. This process will create a conformal, tight sliding-fit clearance between the parts.

Figure 6:
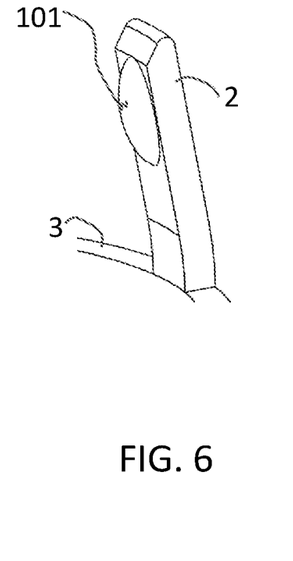
FIG. 6 discloses contact areas that are ellipsoidal domes.
Figure 7:
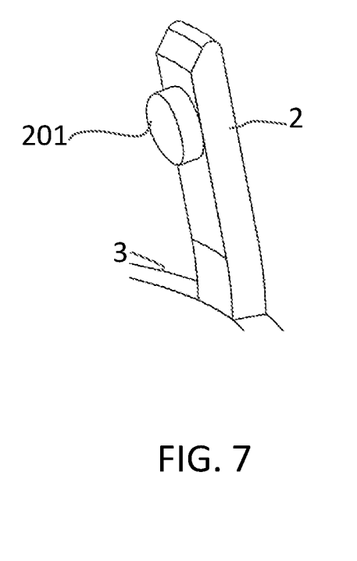
FIG. 7 discloses contact areas that are pins.
Figure 8:
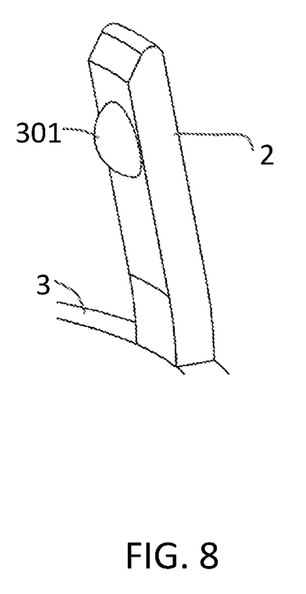
FIG. 8 discloses contact areas that are spherical domes.
Figure 9:
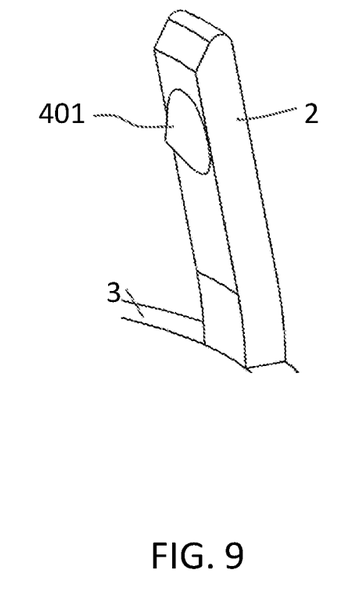
FIG. 9 discloses contact areas that are pointed styluses.

FIGS. 6-9 provide alternative embodiments of contact areas. FIG. 6 discloses contact areas 101 that are ellipsoidal domes; FIG. 7 discloses contact areas 201 that are pins; FIG. 8 discloses contact areas 301 that are spherical domes; and FIG. 9 discloses contact areas 401 that are pointed styluses.

It will be further understood that various changes in the details, materials, and arrangements of the parts which have been described and illustrated in order to explain the nature of this invention may be made by those skilled in the art without departing from the scope of the invention as expressed in the following claims.

We claim:
1. A rotor bearing system comprising:
   a mandrel; and
   a plurality of cantilever bearing pads having a contact area supporting the mandrel, wherein the bearing pads bend outwardly from the mandrel such that, when the bearing pads are run-in against the mandrel, the bearing pads generate uniform bearing gaps and alignment,
   wherein the mandrel and the bearing pads are sized to form a running proximity to exclude the entry of red blood cells therebetween during operation.

2. The bearing system according to claim 1, wherein the contact area is rectangular in shape.

3. The bearing system according to claim 1, wherein the contact area is generally rectangular in shape with a taper.

4. The bearing system according to claim 1, wherein the bearing pads are generally rectangular in shape with two tapers.

5. The bearing system according to claim 1, wherein the pads are constructed from an engineered plastic, including one of poly ether-ether ketone (PEEK), ultra-high molecular weight polyethylene (UHMWPE), polyetherimide, and polytetrafluoroethylene (PTFE).

6. The bearing system according to claim 1, wherein the bearing pads comprise spherical domes.

7. The bearing system according to claim 1, wherein the bearing pads comprise pins.

8. The bearing system according to claim 1, wherein the bearing pads comprise ellipsoidal domes.

9. The bearing system according to claim 1, wherein the bearing pads comprise pointed styluses.

10. The bearing system according to claim 1, wherein the bearing pads are fabricated from a material including one of ceramic, aluminum-oxide, sapphire, silicon carbide, and yttria-stabilized zirconia.

11. The bearing system according to claim 1, wherein the mandrel is fixed and the bearing pads are moved rotationally with respect to the mandrel.

12. The bearing system according to claim 1, wherein the bearing pads are fixed and the mandrel is moved rotationally with respect to the bearing pads.

13. The bearing system according to claim 1, where the mandrel is fixed and the bearing pads are moved axially in oscillation with respect to the mandrel.

14. The bearing system according to claim 1, wherein the bearing pads are fixed and the mandrel is moved axially in oscillation with respect to the bearing pads.

15. The bearing system according to claim 1, wherein the mandrel is fixed and the bearing pads are moved rotationally and axially in oscillation with respect to the mandrel.

16. The bearing system according to claim 1, wherein the bearing pads are fixed and the mandrel is moved rotationally and axially in oscillation with respect to the bearing pads.

17. The bearing system according to claim 1, wherein contacting lands on each of the bearing pads are honed to final size and finished by running-in against the mandrel.

18. The bearing system according to claim 1, wherein contacting lands on the bearing pads are formed by running-in in with the presence of an abrasive slurry, paste or media comprising at least one of aluminum oxide, silicon carbide and diamond, on the mandrel for the purpose of completing the bearing system to final size and finished a contacting land adjacent to the mandrel.

19. The bearing system according to claim 1, wherein the mandrel has a cylindrical shape.

20. A rotor bearing system comprising:
   a mandrel; and
   a plurality of canted cantilever bearing pads having a contact area supporting the mandrel, such that, when the bearing pads are run-in against the mandrel, the bearing pads generate uniform bearing gaps and alignment, wherein the mandrel and the bearing pads are sized to form a running proximity to exclude the entry of red blood cells therebetween during operation, wherein the mandrel has a conical shape.

\* \* \* \* \*